United States Patent [19]

Stewart, Jr.

[11] Patent Number: 5,402,650
[45] Date of Patent: Apr. 4, 1995

[54] THERMAL STORAGE COMPOSITION FOR LOW ENERGY ICE HARVESTING, METHOD OF USING SAME

[75] Inventor: William E. Stewart, Jr., Olathe, Kans.

[73] Assignee: The Curators of the University of Missouri, Columbia, Mo.

[21] Appl. No.: 237,267

[22] Filed: May 3, 1994

[51] Int. Cl.[6] .............................................. F25C 1/12
[52] U.S. Cl. ......................................... 62/71; 62/347
[58] Field of Search ................. 62/71, 353, 66, 340, 62/347

[56] References Cited

U.S. PATENT DOCUMENTS

| | | | |
|---|---|---|---|
| 3,074,252 | 1/1963 | Tippman et al. | 62/347 |
| 4,121,431 | 10/1978 | Meudec et al. | 62/66 |
| 4,185,467 | 1/1980 | Garland | 62/81 |
| 4,501,775 | 2/1985 | Parks et al. | 62/66 X |
| 4,907,415 | 3/1990 | Stewart et al. | 62/66 |
| 4,953,360 | 9/1990 | Rzechula | 62/235 X |
| 5,239,819 | 8/1993 | Kinneberg | 62/66 X |

FOREIGN PATENT DOCUMENTS 1208027 7/1986 Canada .
1776153 7/1971 Germany .
3124379 2/1983 Germany .

Primary Examiner—William E. Tapolcai
Attorney, Agent, or Firm—Flehr, Hohbach, Test, Albritton & Herbert

[57] ABSTRACT

The disclosed thermal storage composition includes water, an electrolyte or a non-electrolyte, and a nucleating surfactant. The nucleating surfactant reduces the surface tension of the thermal storage composition and simultaneously promotes nucleation sites within the thermal storage composition. The thermal storage composition is directed along at least one heat exchanger surface cooled by a refrigerant. The thermal storage composition forms ice crystals that selectively accumulate on the heat exchanger surface. Forces resulting from gravity and the interactions with the liquid of the thermal storage composition overcome the adhesion forces between at least a portion of the ice crystals and the heat exchanger surface, causing at least a portion of the ice crystals to separate from the heat exchanger surface. The nucleating surfactant inhibits ice crystal growth on the heat exchanger surface, the smaller resultant ice crystals have reduced contact area and reduced adhesive strength, thereby providing a reliable release from the heat exchanger surface to render low energy ice harvesting.

21 Claims, 2 Drawing Sheets

THERMAL STORAGE COMPOSITION FOR LOW ENERGY ICE HARVESTING, METHOD OF USING SAME

BRIEF DESCRIPTION OF THE INVENTION

This invention relates generally to cool thermal energy storage systems. More particularly, this invention relates to an improved thermal storage composition with reduced ice crystal size, ice crystal growth rate, and surface adhesion.

BACKGROUND OF THE INVENTION

Cool thermal energy storage is increasingly being used in building air conditioning systems. The major advantage of cool thermal energy storage is that it reduces the severity of intermittent peak air conditioning loads. That is, off-peak electrical utility periods may be used to operate the cool storage equipment and thereby alleviate the severity of the peak air conditioning loads. The shift of electrical energy use to utility off-peak periods reduces the customer's demand charges, leading to a reduction in electric bills. In addition, the load shift reduces the utility's system peak demand, thereby improving operating efficiency and reducing costs.

Several methods are currently used for sensible and latent cool thermal energy storage. Dynamic ice harvesters are one technique for latent heat storage. In typical ice harvesting systems, ice is formed on the exterior surface of a heat transfer surface and periodically removed by means of a defrost harvesting cycle, which melts the ice adjacent to the heat transfer surface, thereby allowing all of the ice to be removed from the heat transfer surface. Overall efficiency of the system is adversely effected by the defrost harvesting cycle, which may utilize up to about 20% of the energy input to the system. Mechanical harvesting techniques, such as scrapping ice from a surface, may also be used. However, such techniques also require additional energy.

U.S. Pat. No. 4,907,415 (the '415 patent), owned by the assignee of the present invention and expressly incorporated by reference herein, describes an improved system in which a "self release" harvesting technique is used to efficiently obtain ice for use in a cool thermal energy storage system. The apparatus of the '415 patent includes a thermal storage solution and a heat exchanger.

The thermal storage solution comprises water and a mixture of electrolytes and/or non-electrolytes, such as a 30/70 calcium acetate-magnesium acetate mixture or ethylene glyclol, respectively. When processed by the heat exchanger, the thermal storage solution results in a mixture of liquid and ice crystals, forming a "slush". "Slush" is defined as a soft mass consisting of a mixture of ice crystal solids and liquid. The slush is soft compared to a solid formed from freezing substantially pure water. As will be described below, the solution results in low adhesion forces (compared to substantially crystalline ice) between the ice crystals and the heat exchanger surface. The term "adhere" is used as a generic term for all forces tending to cause a mass consisting of a mixture of solids and a liquid to be attracted to a surface. Low cohesion forces cause the slush to be soft. As used herein, the term "cohere" is used as a generic term for all forces tending to cause ice crystals and a liquid to be attracted to each other.

FIG. 1 illustrates one embodiment of the invention disclosed in the '415 patent. The tank 20 holds the thermal storage solution 22. The liquid portion of the thermal storage solution is removed from the tank 20, using any convenient technique, and is directed through a conduit 24 by a pump 26. The output of the pump 26 is in turn directed by conduit 28 to distributors 30 and 32.

Liquid 33, generally indicated by arrows, from the distributors 30 and 32 is directed to flow down the substantially vertical (downwardly extending) heat exchanger surfaces 34 and 36. Cold refrigerant flows through each of the heat exchanger surfaces, 34 and 36, entering by way of input conduit 38 and exiting by output conduit 40.

The temperature of the refrigerant is selected such that as the liquid 33 flows down the heat exchanger surfaces, 34 and 36, portions of the liquid 33 solidify to form ice crystals, illustrated as reference numeral 42. The accumulated ice crystals 42 interact with the liquid portion 33 of the thermal storage solution, the heat exchanger surfaces 34 or 36, and forces of gravity. The magnitude of these interactions increases as the accumulated ice crystals 42 increase in size and/or thickness. As these interactions become sufficient to overcome adhesion and/or cohesion forces, portions or all of the accumulated ice crystals 42 release from the heat exchanger surfaces 34 and 36 and are accumulated in tank 20. As previously indicated, the tank 20 holds the thermal storage solution, which may be predominantly slush or liquid, depending on the operating history of the system.

It would be desirable to improve upon the technology disclosed in the '415 patent. Specifically, it would be desirable to improve the thermal storage solution such that accumulated ice crystals could be more readily removed from a heat exchanger surface.

SUMMARY OF THE INVENTION

The disclosed thermal storage composition includes water, an electrolyte or a non-electrolyte, and a nucleating surfactant. The nucleating surfactant reduces the surface tension of the thermal storage composition and simultaneously promotes nucleation sites within the thermal storage composition. The thermal storage composition is directed along at least one heat exchanger surface cooled by a refrigerant. The thermal storage composition forms ice crystals that selectively accumulate on the heat exchanger surface. Forces resulting from gravity and/or the interactions with the liquid of the thermal storage composition overcome the adhesion forces between at least a portion of the ice crystals and the heat exchanger surface, causing at least a portion of the ice crystals to separate from the heat exchanger surface. The nucleating surfactant inhibits ice crystal growth on the heat exchanger surface, the smaller resultant ice crystals have reduced contact area and reduced adhesive strength, thereby providing a reliable release from the heat exchanger surface to render low energy ice harvesting.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Figure 1:
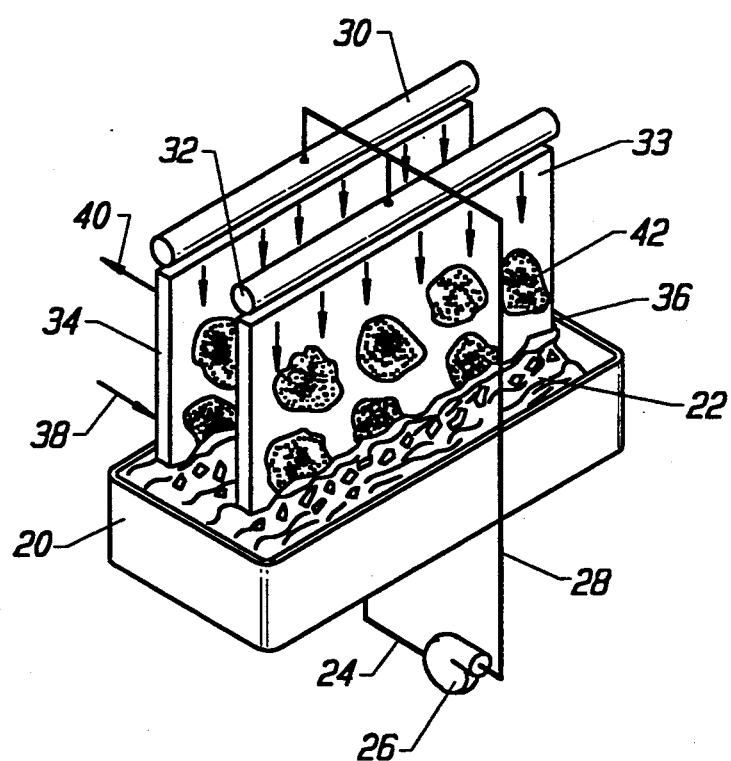
FIG. 1 illustrates a thermal storage solution and a heat exchanger in accordance with the prior art.

The present invention is directed toward a novel thermal storage composition that comprises water, an electrolyte or a non-electrolyte, and a nucleating surfactant. A surfactant generally refers to any soluble compound that reduces the interfacial tension between a liquid and a solid, or between two liquids. A general surfactant with surface tension reduction qualities cannot be successfully employed with the present invention. It has been observed that such a surfactant significantly reduces the surface tension of the thermal storage composition. As a result, ice crystals that form on the heat exchanger surface cannot be dislodged from the surface by the downwardly flowing liquid constituent of the thermal storage composition.

On the other hand, a nucleating surfactant, a surfactant that reduces the surface tension of a thermal storage composition and simultaneously promotes nucleation sites within the thermal storage composition, has demonstrated highly desirable performance. Nucleation is the formation, in a crystallization process, of new crystal nuclei in supersaturated solutions.

An increase in the number of nucleation active sites tends to decrease the equilibrium size of ice crystals. If the nucleation rate is increased, the mass of each crystal is decreased, and hence, the size of each crystal is decreased. It has been observed that the addition of nucleating surfactants to the thermal storage composition of the invention reduces ice crystal size by a factor of approximately 50 percent. Thus, the ice crystals formed in conjunction with the present invention are sometimes referred to as being relatively small.

In the context of the present invention, the inclusion of a nucleating surfactant into the thermal storage composition inhibits individual ice crystals from growing together. As a result, smaller ice crystals are grown. The smaller ice crystals have reduced contact area and reduced adhesive strength to the heat exchanger surface, resulting in adhesive or cohesive failure. Consequently, ice crystals grown on the heat exchanger surface are in the form of a film that reliably releases from the heat exchanger surface. Reliable release of ice crystals from the heat exchanger surface allows for low energy ice harvesting.

Nucleating surfactants successfully used in conjunction with the present invention include: methylamine hydrochloride ($CH_3NH_2HCL$), triethanol amine (($OHCH_2CH_2)_3N$), monoethanol amine ($OHCH_2CH_2N$), monoethylamine hydrochloride ($ClCH_2CH_2N$), and tri-ethylamine hydrochloride ($Cl(OH_2)(CH_2CH_2)_3N$). Preferably, the nucleating surfactants are used with water and electrolytes and/or non-electrolytes at a concentration between 500 and 2000 ppm, preferably approximately 1000 ppm.

Preferably, triethanol amine and monoethanol amine are neutralized with hydrochloric acid. The process of neutralization may be performed by diluting the base surfactant with water to a ratio of 2:1. HCl is then added until a pH of 7 is obtained. This neutralization process attaches the chloride ion of HCl to the surfactant, replacing one of the OH groups. The remaining H and OH ions form a molecule of water. Thus, the neutralized triethanol amine is defined as $Cl(OH)_2(CH_2CH_2)_3N + H_2O$ and the neutralized monoethanol amine is defined as $ClCH_2CH_2N + H_2O$.

A preferable electrolyte for use with the invention is a 7% solution of potassium acetate. The potassium acetate tends to segregate the nucleation and growth of the ice crystals. Other electrolytes that may be used in accordance with the invention include a 30/70 calcium acetate-magnesium acetate mixture, potassium benzoate, sodium benzoate, nickel nitrate, calcium nitrate, sodium acetate, stannic chloride, thorium nitrate, calcium chloride, potassium chloride, sodium chloride, ammonium chloride, beryllium nitrate, magnesium chloride, sodium nitrate, and potassium cyanate.

Non-electrolytes that may be used in accordance with the invention include ethylene glycol, propylene glycol, urea, and sucrose. The thermal storage composition of the invention may also be in the form of a mixture of water, electrolytes and/or non-electrolytes, and a nucleator, such as silver iodide. Similarly, the thermal storage composition of the invention may be in the form of a mixture of water, electrolytes and or non-electrolytes, a surfactant, and a nucleator.

It will be appreciated by those skilled in the art that the thermal storage composition of the invention may be used in conjunction with any of the heat exchangers described in the '415 patent. Similarly, the thermal storage composition of the invention may be used in any of the methods described in the '415 patent.

Figure 2:
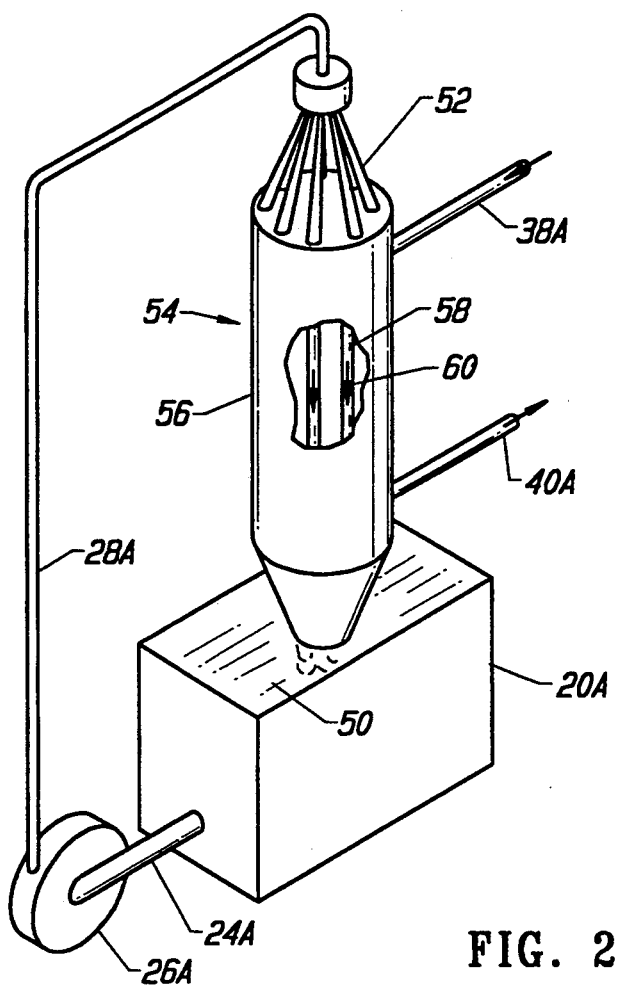
FIG. 2 illustrates a vertical tube-and-shell heat exchanger that may be used with the thermal storage composition of the invention.
Figure 3:
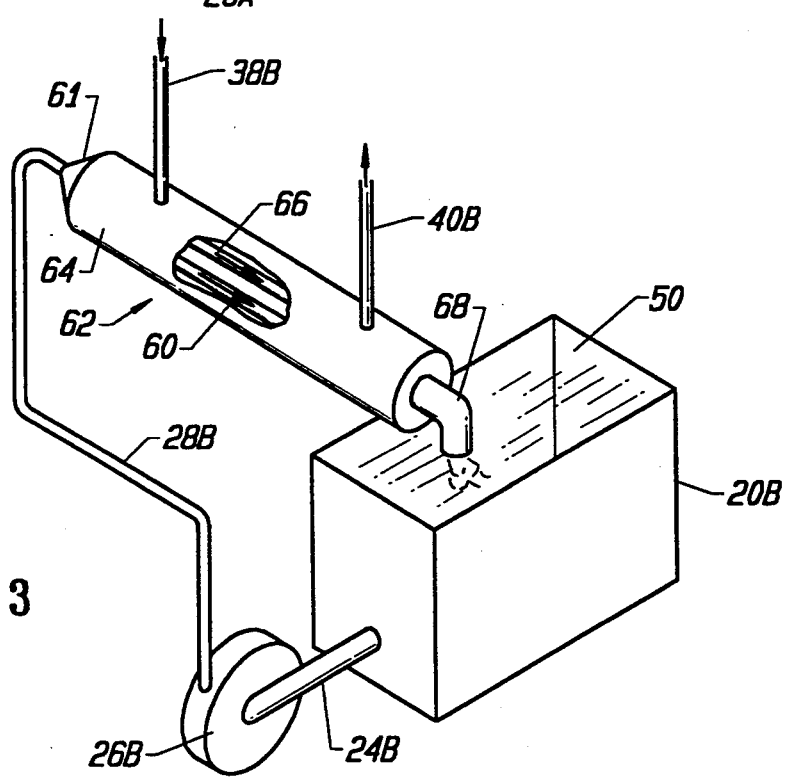
FIG. 3 illustrates a horizontal tube-and-shell heat exchanger that may be used with the thermal storage composition of the invention.

FIGS. 2 and 3 illustrate the use of the thermal storage composition of the invention with tube-and-shell heat exchangers. The elements in FIGS. 2 and 3 are numbered to be consistent with similar elements in FIG. 1.

FIG. 2 depicts a tank 20A that holds the thermal storage composition 50 of the present invention. The liquid portion of the thermal storage composition is removed from the tank 20A and is directed through a conduit 24A by a pump 26A. The output of the pump 26A is in turn directed by conduit 28A to a distributor assembly 52. The distributor assembly 52 is coupled to a vertical tube-and-shell heat exchanger 54 which includes a housing 56 enclosing a plurality of vertical heat exchanger tubes 58. Liquid 60, generally indicated by arrows, from the distributor assembly 52 is directed to flow along the interior walls of the vertical heat exchanger tubes 58. Cold refrigerant circulates within housing 56, entering by way of input conduit 38A and exiting by output conduit 40A.

The temperature of the refrigerant is selected such that as the liquid 60 flows through the vertical heat exchanger tubes 58, portions of the liquid 60 solidify to form ice crystals. The resultant ice crystals and liquid constitute a slurry. The term slurry is used to distinguish from the slush formed in the '415 patent. As used herein, a slurry is a soft mass consisting of a mixture of relatively small ice crystal solids and liquid.

The accumulated ice crystals interact with the liquid portion 60 of the thermal storage solution, the heat exchanger tubes 58, and forces of gravity. As indicated above, these interactions readily dislodge the accumulated ice crystals from the walls of the vertical tubes 58. As a result, the mixture of ice crystals and liquid which form the slurry returns to the tank 20A. As previously indicated, the tank 20A holds the thermal storage solution 50, which may be predominantly slurry or liquid, depending on the operating history of the system.

FIG. 3 depicts a tank 20B that holds the thermal storage composition 50 of the present invention. The liquid portion of the thermal storage composition is removed from the tank 20B and is directed through a conduit 24B by a pump 26B. The output of the pump 26B is in turn directed by conduit 28B to a distributor assembly 61. The distributor assembly 61 is coupled to a horizontal tube-and-shell heat exchanger 62 which includes a housing 64 enclosing a plurality of horizontal heat exchanger tubes 66. Liquid 60, generally indicated by arrows, from the distributor assembly 61 is directed to flow through the horizontal heat exchanger tubes 66. Cold refrigerant circulates within housing 64, entering by way of input conduit 38B and exiting by output conduit 40B.

The temperature of the refrigerant is selected such that as the liquid 60 flows through the horizontal heat exchanger tubes 66, portions of the liquid 60 solidify to form ice crystals. The accumulated ice crystals interact with the liquid portion 60 of the thermal storage solution and the heat exchanger tubes 66. These interactions dislodge the accumulated ice crystals. The moving liquid portion of the thermal storage composition transports the dislodged ice crystals and liquid, which form the slurry, to a disposal conduit 68, which returns the slurry to the tank 20B.

The foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following Claims and their equivalents.

I claim:

1. A thermal storage composition comprising:
    water;
    an electrolyte or a non-electrolyte; and
    a nucleating surfactant, wherein said thermal storage composition is directed along at least one heat exchanger surface cooled by a refrigerant, said thermal storage composition forming ice crystals that selectively accumulate on said heat exchanger surface, forces resulting from gravity and the interactions with the liquid portion of said thermal storage composition overcoming the adhesion forces between at least a portion of said ice crystals and said heat exchanger surface, causing at least a portion of said ice crystals to separate from said heat exchanger surface.

2. The thermal storage composition of claim 1 wherein said nucleating surfactant is mono-ethylamine hydrochloride.

3. The thermal storage composition of claim 1 wherein said nucleating surfactant is tri-ethylamine hydrochloride.

4. The thermal storage composition of claim 1 wherein said nucleating surfactant is methylamine hydrochloride.

5. The thermal storage composition of claim 1 wherein said nucleating surfactant is triethanol amine.

6. The thermal storage composition of claim 5 wherein said triethanol amine is neutralized with hydrochloric acid.

7. The thermal storage composition of claim 1 wherein said nucleating surfactant is monoethanol amine.

8. The thermal storage composition of claim 7 wherein said monoethanol amine is neutralized with hydrochloric acid.

9. The thermal storage composition of claim 1 further comprising a nucleator.

10. The thermal storage composition of claim 9 wherein said nucleator is silver iodide.

11. The thermal storage composition of claim 1 wherein said non-electrolyte is selected from the group comprising ethylene glycol and propylene glycol.

12. The thermal storage composition of claim 1 wherein said non-electrolyte is selected from the group comprising urea and sucrose.

13. The thermal storage composition of claim 1 wherein said electrolyte is potassium acetate.

14. The thermal storage composition of claim 1 wherein said electrolyte is selected from the group comprising calcium acetate, sodium acetate, and magnesium acetate.

15. The thermal storage composition of claim 1 wherein said electrolyte is selected from the group comprising potassium benzoate and sodium benzoate.

16. The thermal storage composition of claim 1 wherein said electrolyte is selected from the group comprising nickel nitrate, thorium nitrate, beryllium nitrate, sodium nitrate, and calcium nitrate.

17. The thermal storage composition of claim 1 wherein said electrolyte is selected from the group comprising stannic chloride, calcium chloride, potassium chloride, sodium chloride, ammonium chloride, and magnesium chloride.

18. A method of producing ice crystals, said method comprising the steps of:
    combining water, an electrolyte or a non-electrolyte, and a nucleating surfactant to form a thermal storage composition;
    directing said thermal storage composition along a heat exchanger surface;
    cooling said heat exchanger surface to form ice crystals in said thermal storage composition, said ice crystals selectively accumulating on said heat exchanger surface, forces resulting from gravity and the interactions with the liquid portion of said thermal storage composition overcoming the adhesion forces between at least a portion of said ice crystals and said heat exchanger surface, causing at least a portion of said ice crystals to separate from said heat exchanger surface.

19. The method of claim 18 wherein said combining step includes the step of selecting a nucleating surfactant from the group comprising: mono-ethylamine hydrochloride, tri-ethylamine hydrochloride, methylamine hydrochloride, neutralized triethanol amine, and neutralized monoethanol amine.

20. The method of claim 18 wherein said combining step includes the step of selecting a non-electrolyte from the group comprising: ethylene glycol, propylene glycol, urea, and sucrose.

21. The method of claim 18 wherein said combining step includes the step of selecting an electrolyte from the group comprising: potassium acetate, calcium acetate, and magnesium acetate, potassium benzoate, sodium benzoate, nickel nitrate, calcium nitrate, sodium acetate, stannic chloride, thorium nitrate, calcium chloride, potassium chloride, sodium chloride, ammonium chloride, beryllium nitrate, magnesium chloride, sodium nitrate, and potassium cyanate.

* * * * *